United States Patent [19]

Ermert et al.

[11] 4,420,516
[45] Dec. 13, 1983

[54] COMPOSITE FILMS FOR DEEP-DRAWN PACKINGS

[75] Inventors: Wolfgang Ermert; Hans W. Funk, both of Bomlitz; Rudi Klein, Walsrode, all of Fed. Rep. of Germany

[73] Assignee: Wolff Walsrode Aktiengesellschaft, Walsrode, Fed. Rep. of Germany

[21] Appl. No.: 360,307

[22] Filed: Mar. 22, 1982

[30] Foreign Application Priority Data

Apr. 11, 1981 [DE] Fed. Rep. of Germany ....... 3114771

[51] Int. Cl.³ .......................... B65D 3/28; B32B 27/10
[52] U.S. Cl. .................................. 428/35; 428/476.3; 428/349
[58] Field of Search .................... 428/347, 349, 476.3, 428/476.9, 35

[56] References Cited

U.S. PATENT DOCUMENTS

4,302,511 11/1981 Taller et al. ...................... 428/475.8

FOREIGN PATENT DOCUMENTS

52-77187 6/1977 Japan ................................. 428/476.9

*Primary Examiner*—George F. Lesmes
*Assistant Examiner*—Beverly K. Johnson
*Attorney, Agent, or Firm*—Sprung, Horn, Kramer & Woods

[57] ABSTRACT

The invention relates to composite packing films shrinkable by deep drawing and consisting of at least one copolyamide layer containing at least 50% by weight of ε-caprolactam units and at least one heat-sealable layer, and optionally, an adhesion-promoting layer.

15 Claims, No Drawings

COMPOSITE FILMS FOR DEEP-DRAWN PACKINGS

This invention relates to composite films which are shrinkable by deep drawing, which comprises copolyamides and ethylene copolymers, and which are particularly suitable for packing foods, such as meat and sausage products, by means of deep-drawing machines.

Composite films of polyamides, preferably PA-6, and polyethylene have already been used for packing foods. However, in cases where composite films of this type are used for producing vacuum packs in deep-drawing machines, pleats are formed around the packed product. These pleats not only make the packing unattractive in appearance, but they can also cause damages of the packing through perforation of the pleats under mechanical stressing.

Accordingly, there is a considerable need to provide deep-drawn packings, particularly for foods, which have a pleat-free appearance.

Surprisingly, this requirement can be satisfied by using composite films according to the invention which are shrinkable after being deep drawn and which consist of (1) at least one layer of at least one copolyamide containing at least 50% by weight of $\epsilon$-caprolactam units and having a melting temperature in the range of from 75° to 215° C., preferably in the range of from 160° to 200° C., and optionally a saponified ethylene/vinyl acetate copolymer and/or ionomer resin, (2) at least one heat-sealable layer of a (co)polymer containing at least 50 mole percent of ethylene, and optionally (3) a standard adhesive or adhesion-promoting layer between layers (1) and (2).

The present invention also relates to pleat-free deep-drawn packings, particularly for foods, such as meats and sausages, which have been produced from the composite films according to the invention.

Copolyamides containing at least 50% by weight of $\epsilon$-caprolactam and preferably further monomers such as lauric lactam, or hexamethylene diamine/adipic acid or isophthalic acid/isophorone diamine and melting at temperatures in the above-mentioned range are suitable for the production of layer (1).

The heat-sealing layer (2) may be produced from copolymers consisting of at least 50 mole percent of ethylene and $\alpha,\beta$-unsaturated monomers such as, for example, $\alpha,\beta$-unsaturated $C_3$–$C_5$-monocarboxylic acids. The copolymers preferably contains from 2 to 25 mole percent of monocarboxylic acid units which may be completely or partly present in the form of alkaline or alkaline earth metal or Zn-salts, preferably Zn- and/or Ca-salts. The melt index of the copolymers is generally in the range of from 0.5 to 40 g/10 mins., as measured in accordance with DIN 53 735. It is particularly preferred to use copolymers of ethylene/(meth)acrylic acid containing from 2 to 25 mole percent and preferably at least 10 mole percent of (meth)acrylic acid units preferably in the form of zinc and/or Ca-salts (ionomer resins).

Layer (2) may also be produced from optionally modified ethylene/vinyl acetate copolymers containing from 2 to 40% by weight and preferably from 3 to 10% by weight of vinyl acetate. However, it is preferred to use quaternary polymers consisting of approximately 71 to 90% by weight of ethylene, 3 to 9% by weight of an aliphatic, ethylenically unsaturated $C_3$–$C_5$-carboxylic acid, 1 to 20% by weight of an ester of an aliphatic, ethylenically unsaturated carboxylic acid with alcohols containing from 1 to 8 carbon atoms, and 0.3 to 5% by weight and preferably 0.8 to 3% by weight of isobutylene, the sum total of the percentages by weight having to amount to 100 in each case. Ethylene/vinyl acetate copolymers consisting of vinyl acetate units, 71 to 90% by weight of ethylene, 3 to 9% by weight of acrylic acid, 1 to 20% by weight of the t-butyl ester of acrylic acid and 0.8 to 3% by weight of isobutylene, are particularly preferred.

Particularly in cases where the above-mentioned vinyl acetate copolymers are used for producing the heat-sealing layer, the bond between the film (1) of copolyamides and the heat-sealing layer should be established by a standard adhesion-promoting layer (3) preferably based on the above-described ionomer resins.

It is also possible to add the adhesion-promoting ionomer resins to the copolyamides in quantities preferably of from 5 to 30% by weight in order in this way to increase the adhesion between the layers.

In order to reduce permeability to gases, particularly to oxygen, it is advantageous to add ethylene/vinyl acetate containing from 50 to 80% by weight or vinyl acetate units, of which at least 90% are saponified, to the copolyamides in quantities of from 5 to 30% by weight.

The composite films according to the invention generally have a thickness of from 90 to 30 $\mu$m and preferably from 160 to 250 $\mu$m in order to give sufficiently stable deep-drawn packings. The copolyamide layer generally has a thickness of from 40 to 120 $\mu$m and preferably from 60 to 100 $\mu$m whilst the heat-sealing layer should have a thickness of from 50 to 200 $\mu$m and preferably from 100 to 180 $\mu$m.

The composite films according to the invention are produced by standard methods, preferably by co-extrusion using the known film blowing method whereby the film can be stretched in a ratio of from 1:2 to 1:6 and preferably in a ratio of from 1:3 to 1:4 in order to guarantee a shrinkage in volume of at least 40% after the packing has been deep drawn.

The packings, preferably for foods, such as sausages or meats, are produced from the composite films according to the invention in conventional deep-drawing packing machines.

In order to obtain pleat-free packing, the following methods may be used for treating the deep-drawn packings according to the invention:

(a) The filled deep-drawn packing is evacuated in the machine and then sealed. It is then shrunk by immersion in a water bath for 1 to 5 seconds at 80° to 100° C. and preferably at 85° to 95° C.

(b) The filled, heat-sealed deep-drawn packing is briefly treated with hot air at 170° to 240° C. and preferably at 220° to 240° C., preferably in a hot-air or superheated-steam tunnel.

(c) It is also possible to obtain shrinkage by contact heat in the deep-drawing packing machine, whereby the already filled packing is sealed (best on top and underneath) in the vacuum chamber of the deep-drawing machine using a suitable surface-sealing tool, and at the same time, shrunk. Surface sealing also serves the purpose of preventing forming of juice which is often observed with many foods.

The packings according to the invention not only have a pleat-free appearance, but they are also distinguished by improved mechanical strength, perforation resistance and flexural strength because the corners of the film container, which are reduced in thickness by deep-drawing, recover much of their thickness and mechanical strength through the shrinkage process. Accordingly, the permeability of the container to gases and water vapour is reduced, thereby ensuring storagable foods for longer periods.

EXAMPLE 1

A composite film is produced from a copolyamide 6/12 of 98% by weight of ε-caprolactam and 2% by weight of lauric lactam or from a copolyamide 6/6,6 of 85% of ε-caprolactam and 15% by weight of hexamethylene diamine/adipic acid or from a copolyamide of 96% by weight of ε-caprolactam and 4% by weight of isophorone diamine/isophthalic acid and an ionomer resin having a melt index of 5.0 g/10 mins. (Surlyn ®) by co-extrusion under the following conditions: temperature in the die 235°–240° C., temperature in the extruder (for layer 1) 230°–245° C. and a rotational speed of 50 r.p.m., temperature (for layer 2) 235°–240° C. and a rotational speed of 70 r.p.m.; extrusion rates approximately 9 m/minute; stretching ratio 1:2. The tubular composite film produced in this way has an overall thickness of 160 μm.

EXAMPLE 2

Layer 1 of the composite film consisting of a copolyamide 6/12 (as in Example 1) and layer 2 consisting of an ethylene/vinyl acetate copolymer containing 8% by weight of vinyl acetate units and having a melt index of 1.3 g/10 mins. are produced by the films blowing method under the same conditions as described in Example 1 with the exception that the two films are bonded to one another by a standard commercial polyurethane-based adhesive.

EXAMPLE 3

Layer 1 of the composite film consisting of a mixture of 10% by weight of an ionomer resin (Surley ®), 20% by weight of polyethylene/vinyl alcohol (70% by weight of vinyl alcohol) and 70% by weight of copolyamide 6/12 (as in Example 1) and layer 2 consisting of an ethylene/vinyl acetate copolymer having a VAc content of 8% by weight, are produced by the film blowing method under the same conditions as described in Example 1 and bonded to one another by a standard commercial polyurethane-based adhesive (layer 3).

TABLE

| | Composition | | Total thickness of films 1 and 2 in | Shrinkage* |
|---|---|---|---|---|
| | layer 1 | layer 2 | μm | % |
| Example 1: | Co PA-6/12 | ionomer resin Surlyn ® | 60/100 | 75 |
| | Co PA-6/6,6 | ionomer resin Surlyn ® | 60/100 | 50 |
| | Co PA-6/isophthalic acid/isophorone diamine | ionomer resin Surlyn ® | 60/100 | 45 |
| Example 2: | Co-PA-6/12 | EVA | 60/120 | 45 |
| Example 3: | 70% of Co-PA-6/12 + 10% of ionomer resin + 20% of ethylene/ vinyl alcohol | EVA | 60/120 | 50 |
| Comparison Example | Pa-6 | EVA | 60/120 | 30 |

*Calculated from the shrinkage in volume of a 100 mm deep-drawn container measuring 100 × 100 mm (volume 1000 ml) after 5 seconds in a water bath at 85° C.

We claim:

1. A heat-sealable composite film shrinkable by deep drawing, which comprises (1) at least one layer of at least one copolyamide 6/12 containing at least 50% by weight of ε-caprolactam units and having a melting temperature of 75° to 215° C.,
(2) at least one heat-sealable layer of a copolymer containing at least 50 mole percent of ethylene and, optionally,
(3) an adhesive or adhesion-promoting layer between layers 1 and 2.

2. A composite film as claimed in claim 1, wherein the melting temperature range of the copolyamide is from 160° to 200° C.

3. A composite film as claimed in claim 1, wherein the copolyamide contains besides ε-caprolactam units, units derived from lauric lactam.

4. A composite film as claimed in claim 1, wherein the copolymer of layer 2 comprises units of ethylene and of an $\alpha,\beta$-unsaturated $C_3$–$C_5$-monocarboxylic acid.

5. A composite film as claimed in claim 4, wherein the monocarboxylic acid units are at least partly present in the form of salts of alkaline metals, alkaline earth metals or Zn.

6. A composite film as claimed in claim 1, wherein the ethylene copolymer has a melt index of from 0.5 to 40 g/10 mins. according to DIN 53 735.

7. A composite film as claimed in claim 1, wherein layer 1 also includes from 5 to 30% by weight of an ethylene/vinyl acetate copolymer containing from 50 to 80% by weight of vinyl acetate units, of which at least 90% are saponified.

8. A heat-sealable composite film according to claim 1, wherein said layer of copolyamide 6/12 additionally contains a saponified ethylene/vinylacetate copolymer.

9. A heat-sealable composite film according to claim 1, wherein said layer of copolyamide 6/12 additionally contains an ionomer resin.

10. A heat-sealable composite film according to claim 8, wherein said layer of copolyamide 6/12 additionally contains an ionomer resin.

11. A heat sealable composite film according to claim 1, wherein said layer of copolyamide 6/12 consists essentially of copolyamide 6/12.

12. A heat sealable composite film according to claim 1, wherein said film has a shrinkage in volume of at least 40% after having been deep-drawn.

13. A heat sealable composite film according to claim 12, wherein said shrinkage is at 50%.

14. A heat sealable composite film according to claim 13, wherein said shrinkage is at least 75%.

15. A heat sealable composite film according to claim 1 which is pleat-free.

* * * * *